US008556134B2

(12) United States Patent
Sacchet

(10) Patent No.: US 8,556,134 B2
(45) Date of Patent: Oct. 15, 2013

(54) CARTRIDGE-TYPE SINGLE-SCREW PUMP AND DYE-METER EQUIPPED WITH SUCH PUMP

(75) Inventor: Alessandro Sacchet, Bene Vagienna (IT)

(73) Assignee: Hero Europe S.R.L. (IT)

(*) Notice: Subject to any disclaimer, the term of this patent is extended or adjusted under 35 U.S.C. 154(b) by 1079 days.

(21) Appl. No.: 12/528,954

(22) PCT Filed: Mar. 1, 2007

(86) PCT No.: PCT/IT2007/000149
§ 371 (c)(1),
(2), (4) Date: Aug. 27, 2009

(87) PCT Pub. No.: WO2008/105007
PCT Pub. Date: Sep. 4, 2008

(65) Prior Publication Data

US 2010/0102092 A1 Apr. 29, 2010

(51) Int. Cl.
*G01F 11/20* (2006.01)

(52) U.S. Cl.
USPC .............................. 222/412; 222/333; 418/48

(58) Field of Classification Search
USPC ........... 222/412, 413, 236, 333, 63, 504, 319, 222/410, 311; 418/48
See application file for complete search history.

(56) References Cited

U.S. PATENT DOCUMENTS 3,966,098 A * 6/1976 Brown .......................... 222/413
5,609,275 A * 3/1997 Brown et al. ................. 222/413
6,138,925 A * 10/2000 Anthony ....................... 239/224
6,688,499 B2 * 2/2004 Zhang ........................... 222/413
2006/1001165 1/2006 Tu
2006/1003980 2/2006 Jordan et al.
2006/0196668 A1 9/2006 Burge et al.
2007/0012378 A1 1/2007 Miller et al.

FOREIGN PATENT DOCUMENTS

EP 1 308 624 5/2003
WO WO 01/07354 2/2001

OTHER PUBLICATIONS

International Search Report dated Nov. 15, 2007 for corresponding application PCT/IT2007/000149.

* cited by examiner

*Primary Examiner* — Kevin P Shaver
*Assistant Examiner* — Robert Nichols, II
(74) *Attorney, Agent, or Firm* — Fleit Gibbons Gutman Bongini & Bianco PL; Stephen Bongini

(57) ABSTRACT

A cartridge-type single-screw pump (1) is provided. The pump (1) is adapted to volumetrically batch and deliver a certain amount of a fluid contained inside at least one storage tank and to supply it to a nozzle or delivering head. The pump (1) including an external fixed pump body (10) and a removable pumping cartridge (20), with the removable pumping cartridge (20) being adapted to be inserted in at least one insertion seat (11) of the external fixed pump body (10) in order to operatively cooperate with this latter one. A dye-meter is also provided. The dye-meter includes at least one cartridge-type single-screw pump (1).

20 Claims, 3 Drawing Sheets

CARTRIDGE-TYPE SINGLE-SCREW PUMP AND DYE-METER EQUIPPED WITH SUCH PUMP

The present invention refers to a cartridge-type single-screw pump, in particular for dye-meters. The present invention further refers to a dye-meter equipped with such cartridge-type single-screw pump.

As known, dye-meters are batching machines for preparing colouring composites, such as paints, enamels, paintings, typically comprising a plurality of storage tanks for individual components and batching and delivering devices of such components adapted to take from individual tanks accurate amounts of a component, depending on desired compositions, in order to come to the desired final compound. In general terms, the prior art has two families of dye-meters: those with tanks in a fixed position connected through ducts to a delivering head placed above a vessel for the final compound, in which the delivery of individual components can simultaneously occur, and those in which the tanks are placed on rotary platforms equipped with a kinematism adapted to place in turn the individual tanks, or individual sub-groups of tanks, on the vessel of the final compound to allow delivering the component.

Moreover, depending on the components batching mode, there are dye-meters with weight batching, typically more accurate but relatively slow since they require weighing in succession all components to be batched, and volumetric dye-meters, so far less accurate than the previous ones, but quicker in preparing the final composites. Moreover, in Patent Application n. WO2006/106540, a volumetric dye-meter is disclosed, equipped, among others, with batching and delivering devices realised as pumps with progressive recesses.

All existing dye-meters however have numerous inconveniences: first of all, given their construction complexity, prior art dye-meters are unavoidably affected by problems related to their reliability in time. In particular, in case of malfunction or breakage of dye batching and delivering devices, a machine stop is unavoidable, which is typically long (generally on the order of 3-5 days for finding spare parts and for specialised assistance interventions), with related discomforts both from the productive, and from the economic points of view. Similarly, the same ordinary maintenance of batching and delivering devices can generate machine stop times of the whole dye-meter that create economic losses and non-neglectable inconveniences.

Therefore, object of the present invention is solving the above prior art problems by providing a cartridge-type single-screw pump, to be used in particular as a batching and delivering device in a dye-meter, substantially composed of an external fixed pump body within which a removable pumping cartridge is inserted, that can be easily, quickly and economically replaced in case of maintenance, breakage or malfunction, thereby avoiding the long and costly ordinary maintenance of the pump as a whole.

Moreover, an object of the present invention is providing a dye-meter equipped with at least one batching and delivering device realised as a cartridge-type single-screw pump according to the present invention.

The above and other objects and advantages of the invention, as will appear from the following description, are obtained with a cartridge-type single-screw pump and with a dye-meter equipped with at least one batching and delivering device realised as a cartridge-type single-screw pump as described in the independent claims. Preferred embodiments and non-trivial variations of the present invention are the subject matter of the dependent claims.

The present invention will be better described by some preferred embodiments thereof, provides as a non-limiting example, with reference to the enclosed drawings, in which.

Figure 2:
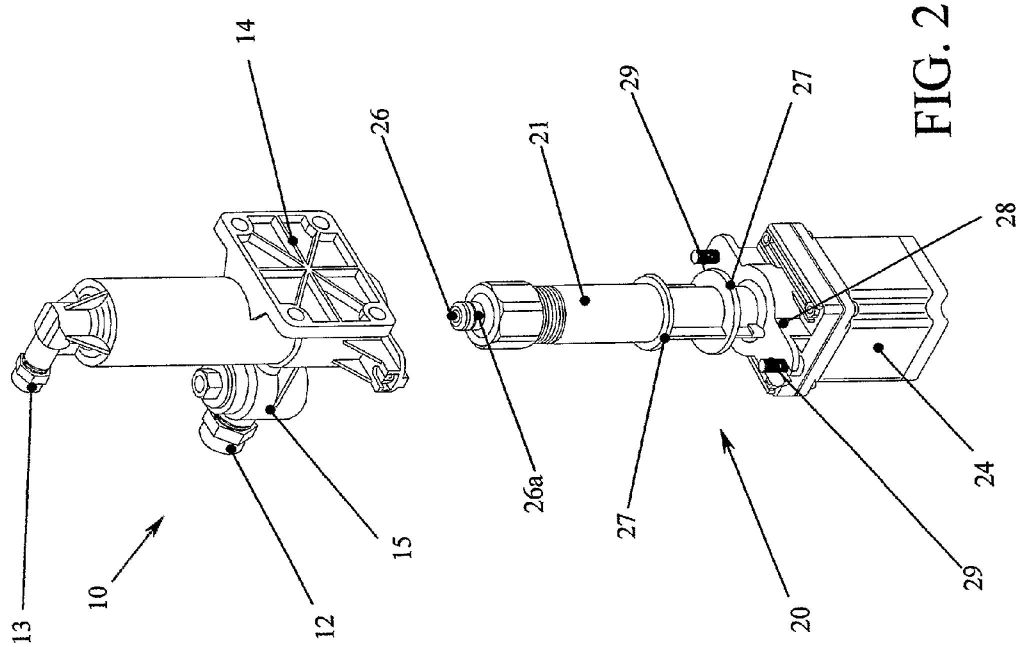
FIG. 2 shows a perspective view of the cartridge-type single-screw pump of FIG. 1 in which the removable pumping cartridge and the external fixed pump body are mutually separated.
Figure 1:
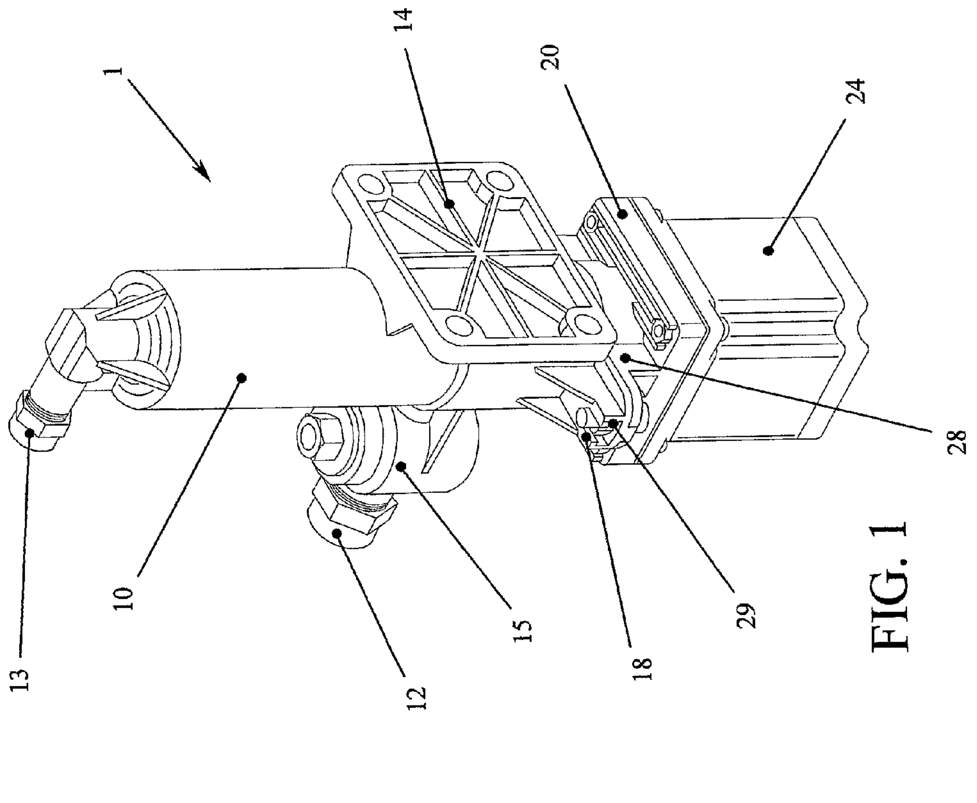
FIG. 1 shows a perspective view of a preferred embodiment of the cartridge-type single-screw pump according to the present invention.
Figure 3B:
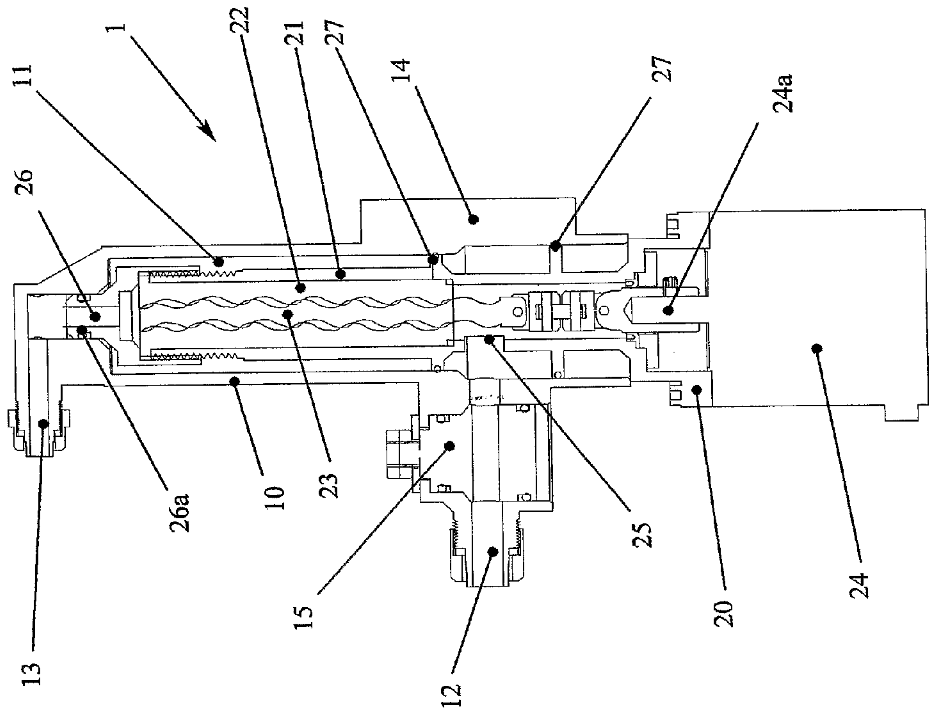
Figure 3A:
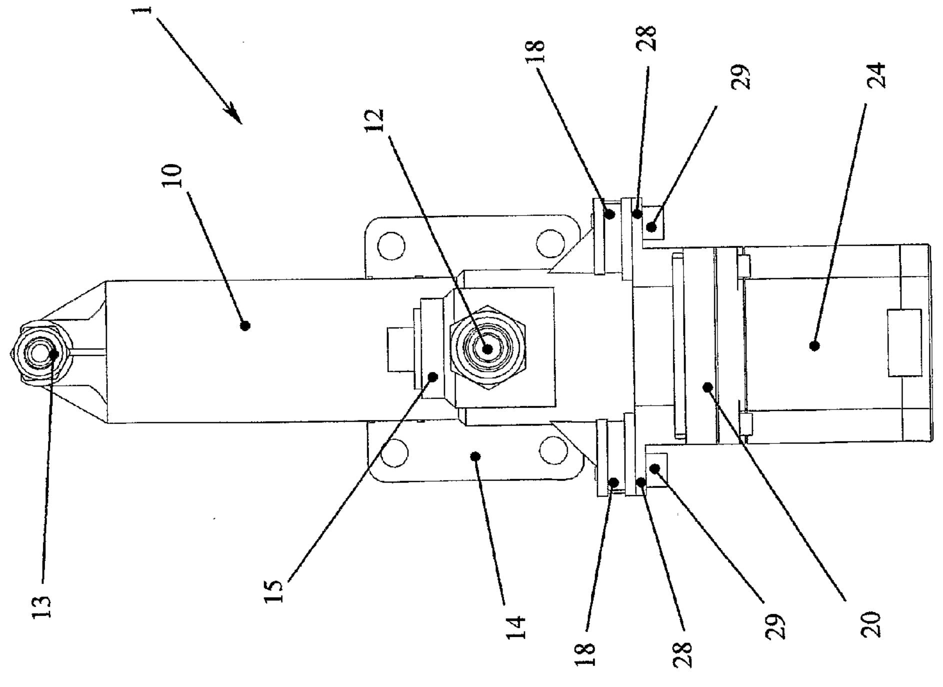
Figure 4:
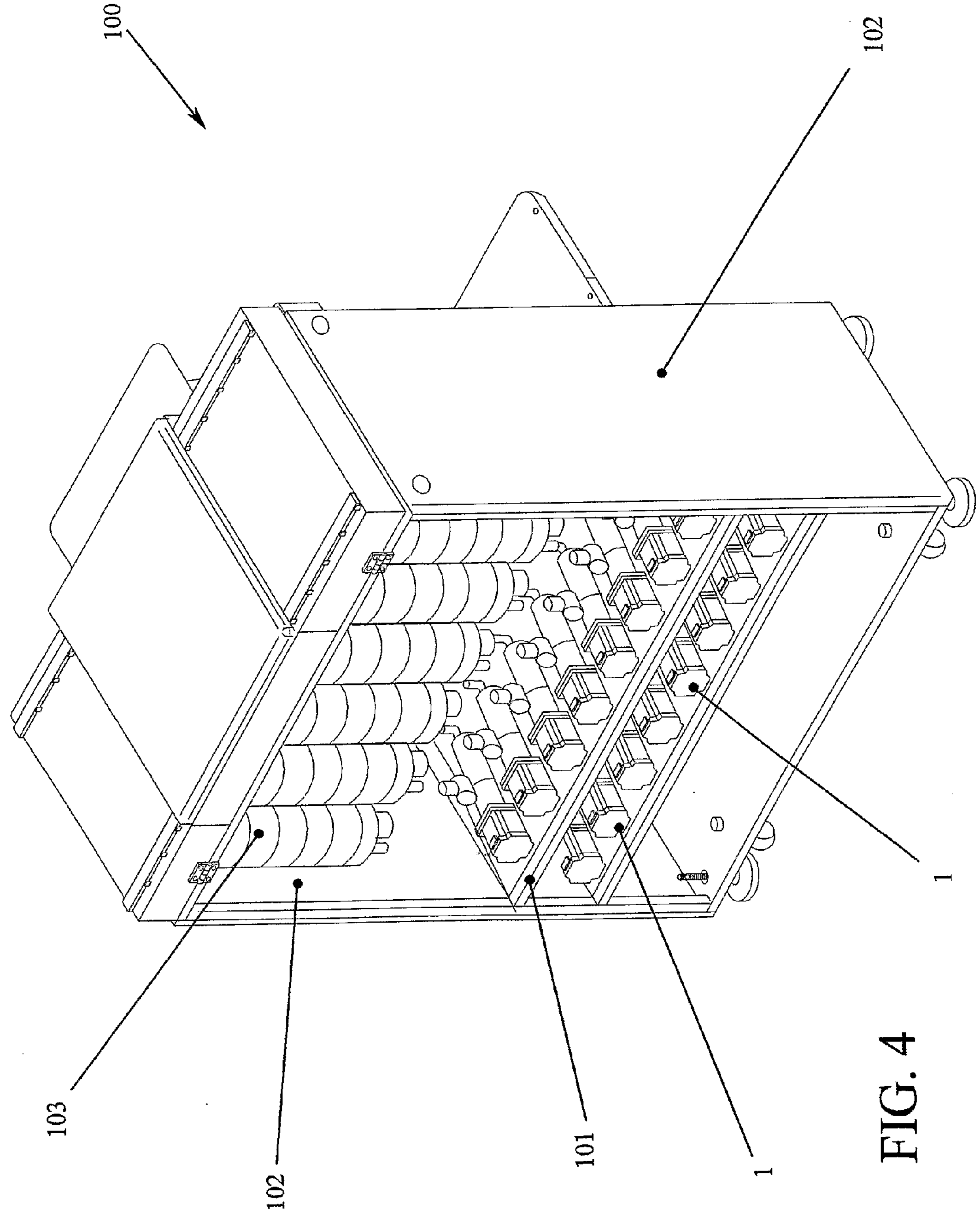

FIG. 3*a* shows a front view of the cartridge-type single-screw pump of FIG. 1;

FIG. 3*b* shows a sectional view of the cartridge-type single-screw pump according to section line A-A in FIG. 1; and FIG. 4 shows a perspective view of a preferred embodiment of the dye-meter according to the present invention.

The cartridge-type single-screw pump according to the present invention is adapted to volumetrically batch a certain amount of a fluid, for example a colouring component, preferably contained inside storage means and to deliver it towards suitable distributing means, such as for example a nozzle or a delivering head like those known in the art.

As will be seen below in the present description, the practical and technical arrangement of individual components of the cartridge-type single-screw pump 1 according to the present invention is within the scope of any technician in the art, as well as the numerous, but trivial, possible design and constructive variations thereof.

With particular reference to FIGS. 1, 2 3*a* and 3*b*, it is possible to note that the cartridge-type single-screw pump 1 according to the present invention is composed of an external fixed pump body 10 and a removable pumping cartridge 20, this latter one being adapted to be inserted in at least one insertion seat 11 of the external fixed pump body 10 and to operatively cooperate with this latter one.

In particular, the external fixed pump body 10 comprises a first inlet fluidic duct 12 and a second outlet fluidic duct 13, such first and second ducts respectively 12 and 13 communicating with the interior of the insertion seat 11. The first inlet fluidic duct 12 is particularly adapted to be connected, by interposing circuit fluidic connection means (not shown and preferably made as at least one duct), to fluid storage means (such fluid being preferably a dye) to be batched and delivered. The first inlet fluidic duct 12 can further be equipped with at least one adjusting valve 15 for the fluid flow-rate that crosses it. The second outlet fluidic duct 13 instead is particularly adapted to be connected to the fluid distributing means by interposing other circuit fluidic connection means (not shown).

Obviously, the external fixed pump body 10 can be equipped with suitable securing means to a machinery, such as for example a dye-meter, to be served: for example, the securing means can be made as at least one bracket 14 to be fixed to the machinery through screws or bolts.

The removable pumping cartridge 20 is in particular a pump with progressive recesses (device usually employed for pumping extremely viscous substances, such as for example concretes) comprising an external housing 21 containing a pump stator 22 inside which an internal rotor 23 can rotate under the action of at least one driving motor 24 connected therewith (in particular, the drive shaft 24*a* of the driving motor 24 is preferably connected to the internal rotor 23 in such a way as to be coaxial with the rotation axis of the internal rotor 23 itself). In particular, the internal rotor 23 is shaped as a worm screw with progressive recesses whose relative rotation with respect to the stator 22 causes a translation movement of the fluid present inside it. The external housing 21 is equipped with a first inlet opening 25 adapted to correspond with the first inlet fluidic duct 12 and to communicate the first inlet fluidic duct 12 with the interior of the stator 22 when the removable pumping cartridge 20 is inserted inside the insertion seat 11 of the external fixed pump body 10.

Next to the outlet end of the pump with progressive recesses, the external housing 21 is equipped with a second outlet opening 26 adapted to correspond with the second outlet fluidic duct 13 and to communicate the stator 22 interior with the second outlet fluidic duct 13 itself when the removable pumping cartridge 20 is inserted inside the insertion seat 11 of the external fixed pump body 10. Preferably, the second outlet opening 26 is realised as an attachment nipple equipped with related sealing means 26*a* adapted to be inserted and tightly coupled inside the second outlet fluidic duct 13.

Along the external surface of the external housing 21, it is possible to provide for the arrangement of other sealing means, such as for example at least one gasket 27 (as an example, the external housing 21 of the pump 1 according to the invention shown in the Figures is equipped with two sealing gaskets 27), adapted to perform a suitable seal between external housing 21 and insertion seat 11 of the external fixed pump body 10.

When actuated by the driving motor 24, the pump with progressive recesses of the removable pumping cartridge 20, during the rotation movement of its internal rotor 23, transfers certain amounts of fluid, entering inside the stator 22 through the first inlet fluidic duct 12 and the first inlet opening 25, towards and through the second outlet opening 26 and the second outlet fluidic duct 13.

The advantages deriving from the use of the pump with progressive recesses in the removable pumping cartridge 20 are numerous:

when the internal rotor 23 is unmoving with respect to the stator 22, the pump with progressive recesses guarantees a perfect seal;

the reliability of the pump with progressive recesses is practically total, since the single moving part is the internal rotor 23 and the wear due to revolving friction due to the relative movement between internal rotor 23 and stator 22 is neglectable;

contrary to traditional pumping systems, such as for example piston pumps, in which the pumping effect is cyclic due to the piston stroke, the pump with progressive recesses allows a continuous fluid delivery;

the pump with progressive recesses allows an extremely accurate volumetric fluid delivery: in fact, the delivered volumetric batching is proportional to the rotation performed by the internal rotor 23, whose rotation is controlled down to the order of fraction of a degree through the driving motor 24;

once having ended the fluid delivery, imposing a counter-rotation of a suitable amount to the internal rotor 23, it is possible to suck part of the fluid remained inside the stator 22, consequently avoiding possible drippings at distribution means level.

In order to make the removable pumping cartridge 20 integral with the external fixed pump body 10, and thereby make the operation of the pump 1 according to the present invention safer, more reliable and efficient, the external housing 21 can be equipped with securing means to the insertion seat 11; preferably, as shown in the Figures, the securing means can be made as a first flange 28 integral with the removable pumping cartridge 20, adapted to be coupled with a respective second flange 18 integral with the external fixed pump body 10, such first and second flanges respectively 28 and 18 adapted to be mutually connected through adequate connection means, such as for example screws or bolts 29.

Therfore, contrary to what has been proposed by the prior art, in which in case of malfunction or maintenance of a batching and delivering device, this latter one must be almost completely disassembled and possibly cleaned from dye deposits remaining inside it, the cartridge-type single-screw pump 1 according to the present invention allows obtaining the same results by simply and quickly withdrawing the removable pumping cartridge 20 from the external fixed pump body 10 and replacing it with another new removable pumping cartridge 20.

The present invention further refers to a dye-meter equipped with at least one cartridge-type single-screw pump 1 according to the present invention and as previously described. With reference in particular to FIG. 4, it is possible to note that a dye-meter 100 according to the present invention comprises a supporting structure 101, that obviously can be equipped with removable coating panels 102 in order to protect the pump 1 from external agents containing at least one cartridge-type single-screw pump 1, whose first inlet fluidic duct 12 is connected through circuit fluidic connection means (not shown) to storage means (preferably made as at least one tank 103) of a colouring component and whose second outlet fluidic duct 13 is connected through other circuit fluidic connection means (not shown) to the distributing means (not shown) of the colouring component itself, under which a vessel (not shown) can be arranged, adapted to collect the final colouring compound. The dye-meter 100 according to the present invention can also comprise managing means that, in particular, by operating on the driving motor 24 of each pump 1, check the correct batching and delivery of individual colouring components to obtain the final colouring compound depending on a certain composition formula. Advantageously, the managing means of the dye-meter 100 can be those substantially known for managing and driving traditional dye-meters; in particular, the managing means can comprise a known PC through which the pump 1 operation can be managed and, among other things, formulations of final colouring compounds can be inserted, amended and/or modified.

Obviously, the number and arrangement of the above components, and in particular of the cartridge-type single-screw pumps 1 according to the present invention, can be different, and particularly depending on the variety of colouring compounds that the dye-meter 100 according to the present invention must be able to produce.

The invention claimed is:

1. A cartridge-type single-screw pump adapted to volumetrically batch and deliver a certain amount of a fluid contained inside storage means and to deliver such fluid towards distributing means, the single-screw pump comprising:

an external fixed pump body; and a removable pumping cartridge, the removable pumping cartridge being adapted to be inserted into at least one insertion seat of the external fixed pump body in order to operatively cooperate with the external fixed pump body, wherein the removable pumping cartridge comprises:

an external housing containing a stator inside, an internal rotor being able to rotate the stator under the action of at least one driving motor;

a first inlet opening in the external housing, the first inlet opening being adapted to correspond with a first inlet fluid tube and to communicate the first inlet fluid tube with an interior of the stator when the removable pumping cartridge is inserted into the insertion seat of the external fixed pump body; and the external housing including a second outlet opening, the second outlet opening being adapted to correspond with a second outlet fluid tube and to communicate the interior of the stator with the second outlet fluid tube when the removable pumping cartridge is inserted into the insertion seat of the external fixed pump body, wherein the second outlet opening is a connection nipple equipped with sealing means adapted to be inserted in the second outlet fluid tube.

2. The pump of claim 1, wherein the external fixed pump body comprises the first inlet fluid tube and the second outlet fluid tube, the first inlet fluid tube and the second outlet fluid tube communicating with an interior of the insertion seat.

3. The pump of claim 2, wherein the first inlet fluid tube is connected to the storage means by an interposing fluid connecting means.

4. The pump of claim 3, wherein the first inlet fluid tube comprises at least one adjusting valve.

5. The pump of claim 2, wherein the second outlet fluid tube is connected to the distribution means by an interposing fluid connecting means.

6. The pump of claim 1, wherein a drive shaft of the driving motor is connected to the internal rotor so as to be coaxial with a rotation axis of the internal rotor.

7. The pump of claim 1, wherein the internal rotor is shaped as a worm screw with progressive recesses.

8. The pump of claim 1, wherein the external housing comprises external sealing means for performing a sealing with the insertion seat of the external fixed pump body.

9. The pump of claim 1, wherein the external housing comprises attaching means for attaching the removable pumping cartridge to the insertion seat.

10. The pump of claim 9, wherein the attaching means comprises:

a first flange integral with the removable pumping cartridge; and a second flange integral with the external fixed pump body, the second flange being adapted to be coupled with the first flange, wherein the first and second flanges are adapted to be mutually connected through connection means.

11. The pump of claim 10, wherein the connection means comprises at least one of a screw and a bolt.

12. A dye-meter comprising at least one cartridge-type single-screw pump that is adapted to volumetrically batch and deliver a certain amount of a fluid contained inside storage means and to deliver such fluid towards distributing means, the single-screw pump comprising:

an external fixed pump body; and a removable pumping cartridge, the removable pumping cartridge being adapted to be inserted into at least one insertion seat of the external fixed pump body in order to operatively cooperate with the external fixed pump body, wherein the removable pumping cartridge comprises:

an external housing containing a stator inside, an internal rotor being able to rotate the stator under the action of at least one driving motor;

a first inlet opening in the external housing, the first inlet opening being adapted to correspond with a first inlet fluid tube and to communicate the first inlet fluid tube with an interior of the stator when the removable pumping cartridge is inserted into the insertion seat of the external fixed pump body; and the external housing including a second outlet opening, the second outlet opening being adapted to correspond with a second outlet fluid tube and to communicate the interior of the stator with the second outlet fluid tube when the removable pumping cartridge is inserted into the insertion seat of the external fixed pump body, wherein the second outlet opening is a connection nipple equipped with sealing means adapted to be inserted in the second outlet fluid tube.

13. The dye-meter of claim 12, further comprising:

a supporting structure containing the at least one single-screw pump, wherein the first inlet fluid tube of the single-screw pump is connected through a first fluid connecting means to the storage means, which stores at least one coloring component, and the second outlet fluid tube of the single-screw pump is connected through a second fluid connecting means to the distributing means.

14. The dye-meter of claim 13, wherein the storage means comprises at least one tank.

15. The dye-meter of claim 13, wherein the supporting structure comprises removable panels.

16. The dye-meter of claim 12, wherein the internal rotor of the single-screw pump is shaped as a worm screw with progressive recesses.

17. A cartridge-type single-screw pump adapted to volumetrically batch and deliver a certain amount of a fluid, the single-screw pump comprising:

an external fixed pump body; and a removable pumping cartridge, the removable pumping cartridge being adapted to be inserted into at least one insertion seat of the external fixed pump body in order to operatively cooperate with the external fixed pump body, wherein the removable pumping cartridge comprises:

an external housing containing a stator inside, an internal rotor being able to rotate the stator under the action of at least one driving motor;

a first inlet opening in the external housing, the first inlet opening being adapted to correspond with a first inlet fluid tube and to communicate the first inlet fluid tube with an interior of the stator when the removable pumping cartridge is inserted into the insertion seat of the external fixed pump body; and the external housing including a second outlet opening, the second outlet opening being adapted to correspond with a second outlet fluid tube and to communicate the interior of the stator with the second outlet fluid tube when the removable pumping cartridge is inserted into the insertion seat of the external fixed pump body, wherein the second outlet opening is a connection nipple equipped with sealing means adapted to be inserted in the second outlet fluid tube.

18. The pump of claim 17, wherein the first inlet fluid tube is connected to fluid storage by an interposing first fluid connection, and the second outlet fluid tube is connected to fluid distribution by an interposing second fluid connection.

19. The pump of claim 17, wherein a drive shaft of the driving motor is connected to the internal rotor so as to be coaxial with a rotation axis of the internal rotor.

20. The pump of claim 17, wherein the internal rotor is shaped as a worm screw with progressive recesses.

* * * * *